United States Patent [19]

Nishi et al.

[11] Patent Number: 5,599,882
[45] Date of Patent: Feb. 4, 1997

[54] RING-OPENING POLYMER AND A PROCESS FOR PRODUCTION THEREOF

[75] Inventors: Yoshikatsu Nishi, Yokohama; Masayoshi Ohshima, Niiza; Teiji Kohara, Kawasaki; Toshiyasu Matsui, Yokohama; Tadao Natsuume, Yokosuka, all of Japan

[73] Assignee: Nippon Zeon Co., Ltd., Tokyo, Japan

[21] Appl. No.: 465,155

[22] PCT Filed: Aug. 31, 1988

[86] PCT No.: PCT/JP88/00862

§ 371 Date: Feb. 13, 1990

§ 102(e) Date: Feb. 13, 1990

[87] PCT Pub. No.: WO89/01953

PCT Pub. Date: Mar. 9, 1989

[30] Foreign Application Priority Data

| Dec. 6, 1986 | [JP] | Japan | 61-290990 |
| Sep. 1, 1987 | [JP] | Japan | 62-216461 |
| Sep. 1, 1987 | [JP] | Japan | 62-216462 |
| Dec. 5, 1987 | [JP] | Japan | 62-306850 |

[51] Int. Cl.$^6$ .................. C08F 4/642; C08F 232/06
[52] U.S. Cl. ............. 525/332.1; 526/281; 526/282; 526/283; 526/141; 525/338; 525/339; 525/940
[58] Field of Search ................... 526/283, 281, 526/282, 141; 525/332.1

[56] References Cited

U.S. PATENT DOCUMENTS

| 3,557,072 | 1/1971 | Vergne et al. | 260/88.2 |
| 4,136,247 | 1/1979 | Tenney | 526/283 |
| 4,380,617 | 4/1983 | Minchak et al. | 526/161 |
| 5,011,730 | 4/1991 | Tenney et al. | 428/209 |

FOREIGN PATENT DOCUMENTS

| 0002278 | 6/1979 | European Pat. Off. |
| 0084375 | 7/1983 | European Pat. Off. |
| 0156464 | 10/1985 | European Pat. Off. |
| 0303246 | 2/1989 | European Pat. Off. |
| 46-14910 | 4/1971 | Japan |
| 51-80400 | 7/1976 | Japan |
| 52-126456 | 10/1977 | Japan |
| 63-145324 | 6/1988 | Japan |
| 2102221 | 4/1990 | Japan |

OTHER PUBLICATIONS

Patent Abstracts of Japan, vol. 9, No. 138 (C–286) [1861], 13th Jun. 1985; & JP-A-60 26 024 (Nippon Zeon K.K.) Feb. 8, 1985.

Database WPI, AN 76–65680x, Derwent Publications LTD, London, GB; & JP-A-51 080 400 (Nippon Oil K. K.) Jul. 14, 1976.

*Primary Examiner*—Mark Nagumo
*Attorney, Agent, or Firm*—Armstrong, Westerman, Hattori, McLeland & Naughton

[57] ABSTRACT

The present invention discloses a polycyclic norbornene-based ring-opening polymer which comprises (A) 90–5% by mol of a repeating unit represented by the following formula [I] or the alkyl-substituted derivative thereof, and (B) 10–95% by mol of at least one repeating unit selected from a repeating unit represented by the following formula [II], the alkyl-substituted derivative thereof, a repeating unit represented by the following formula [III], the alkyl-substituted derivative thereof, or the alkylidene-substituted derivative thereof, and which has an intrinsic viscosity [η] of 0.01–20 dl/g as determined in toluene at 25° C., the hydrogenation products thereof, and a process for production thereof

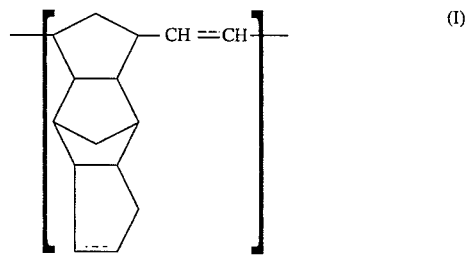

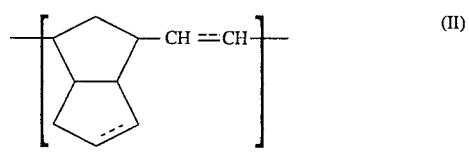

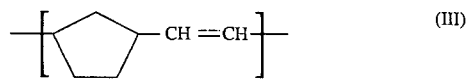

wherein ——— denotes a single bond or a double bond.

11 Claims, No Drawings

RING-OPENING POLYMER AND A PROCESS FOR PRODUCTION THEREOF

TECHNICAL FIELD

The present invention relates to a novel ring-opening polymer and the hydrogenation product thereof which are excellent in thermal resistance and have well-balanced properties including transparency, water resistance, chemical resistance, solvent resistance, dielectric characteristic and mechanical properties such as rigidity. More specifically, it relates to a polycyclic norbornene-based ring-opening polymer and the hydrogenation product thereof, and to a process for production thereof.

BACKGROUND ART

Polymeric materials heretofore mainly used for optics are polymethyl methacrylate and polycarbonate. However, the former has a problem of high water absorption and the latter is insufficient in birefringence after injection molding. Accordingly, it is becoming difficult for them to meet the requirements for such materials that are becoming increasingly more severe.

In recent years, polymers based on polycyclic norbornene-type monomers have been developed as polymeric materials overcoming the above-mentioned problems. For example, Japanese Patent Application Kokai (Laid-open) No. 60-26024 describes that hydrogenation products of ring-opening copolymers of tetracyclododecenes and norbornenes or ring-opening polymers of tetracyclododecenes are excellent in transparency, water resistance and thermal resistance. Japanese Patent Application Kokai (Laid-open) Nos. 60-168708 and 61-292601 disclose that addition polymers of either tetracyclododecenes or polycyclic norbornene-type monomers having more rings and α-olefins are excellent in transparency, thermal resistance, chemical resistance, water resistance, etc. Thus, polycyclic norbornene-based polymers have excellent properties for use as optical polymers. However, there are problems in that generally the monomers are hardly available and very expensive and that they are still limited in their variety.

DISCLOSURE OF THE INVENTION

The present inventors have made extensive study to develop a novel synthetic resin suited for use as optical polymer or the raw material therefor by using polycyclic norbornene-type monomers available more inexpensively. As a result, it has been found that ring-opening polymers obtainable by ring-opening polymerizing a polycyclic monomer of a specific structure, namely pentacyclopentadecadiene and/or pentacyclopentadecene together with other comonomers, particularly the hydrogenation products thereof, are excellent in thermal properties and have well-balanced properties including transparency, water resistance, chemical resistance, solvent resistance, dielectric characteristic, and mechanical properties such as rigidity, and are useful for use as various formed articles. The present invention has been accomplished on the basis of the above finding.

The "hydrogenation products of polycyclic norbornene-based ring-opening polymers" referred to in the present invention signify those in which at least 50% of the double bonds present in the main chain of said polymer have been hydrogenated. They are sometimes expressed as those in which at least 50% of the (C———C) linkages constituting the main chain are single bonds. As a matter of course, double bonds present in other parts than the main chain may have been hydrogenized.

BEST MODE FOR CARRYING OUT THE INVENTION

The first aspect of the present invention relates to a polycyclic norbornene-based ring-opening polymer which comprises (A) 90–5% by mol of a repeating unit represented by the following formula [I] or the alkyl-substituted derivative thereof, and (B) 10–95% by mol of at least one repeating unit selected from a repeating unit represented by the following formula [II], the alkyl-substituted derivative thereof, a repeating unit represented by the following formula [III], the alkyl-substituted derivative thereof or the alkylidene-substituted derivative thereof, and which polymer has an intrinsic viscosity [η] of 0.01–20 dl/g as determined in toluene at 25° C.

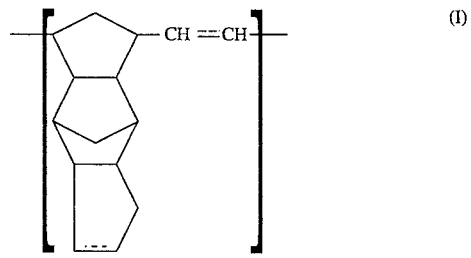

wherein ——— denote a single bond or a double bond.

The second aspect of the present invention relates to a polycyclic norbornene-based ring-opening polymer which comprises (A) 90–5% by mol of a repeating unit represented by the above formula [I] or the alkyl-substituted derivative thereof, and (B) 10–95% by mole of at least one repeating unit selected from a repeating unit represented by the above formula [II], the alkyl-substituted derivative thereof, a repeating unit represented by the above formula [III], the alkyl derivative thereof or the alkylidene derivative thereof, which polymer has an intrinsic viscosity [η] of 0.01–20 dl/g as determined in toluene at 25° C., and in which at least 50% of the (C——— C) linkage constituting the main chain are single bonds.

The third aspect of the present invention relates to a process for producing a polycyclic norbornene-based ring-opening polymer which comprises (A) 90–5% by mol of a repeating unit represented by the following formula [I'] or the alkyl-substituted derivative thereof, and (B) 10–95% by mol of at least one repeating unit selected from a repeating unit represented by the following formula [II'], the alkyl-substituted derivative thereof, a repeating unit represented by the following formula

[III'], the alkyl-substituted derivative thereof or the alkylidene-substituted derivative thereof, and which polymer has an intrinsic viscosity [η] of 0.01–20 dl/g as determined in toluene at 25° C.

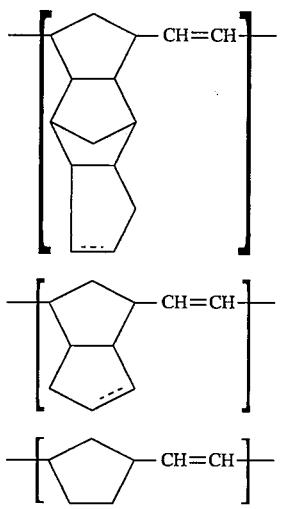

wherein ——— denotes a single bond or a double bond.

More specifically, it relates to a process for producing the above-mentioned polycyclic norbornene-based ring-opening polymer which is characterized by polymerizing a monomer mixture comprising 90–5% by mol of 4,9,5,8-dimethano-3a,4,4a,5,8,8a,9,9a-octahydro-1H-benzoindenes and/or 4,9,5,8-dimethano-2,3,3a,4,4a,5,8,8a, 9,9a-decahydro-1H-benzoindenes and 10–95% by mol of dicyclopentadienes, dihydrodicyclopentadienes and/or norbornenes among the compounds represented by the formula [II], in the presence of a ring-opening polymerization catalyst.

The fourth aspect relates to a process for producing a polycyclic norbornene-based ring-opening polymer hydrogenation product in which at least 50% of the (C———C) linkages constituting the main chain are single bonds which is characterized by hydrogenating with hydrogen a part or the whole of the olefinic unsaturated groups of the above-mentioned polycyclic norbornene-based ring-opening polymer by use of a hydrogenation catalyst.

The ring-opening polymers used in the present invention comprise as major components (A) 4,9,5,8-dimethano-3a,4, 4a,5,8,8a,9,9a-octahydro-1H-benzoindene (namely, pentacyclopentadecadiene), 4,9,5,8-dimethano-2,3,3a,4,4a,5,8, 8a,9,9a-decahydro-1H-benzoindene (namely, pentacyclopentadecene or the alkyl-substituted derivatives thereof (hereinafter sometimes referred to as "component A") and (B) 4,7-methano-3a,4,7,7a-tetrahydro-1H-indene (namely, dicyclopentadiene), 4,7-methano-2,3,3a,4,7,7a-hexahydroindene (namely, dihydrodicyclopentadiene), the alkyl-substituted derivatives thereof, or substituted or unsubstituted norbornene (hereinafter sometimes referred to as "component B"), and may be produced by a conventional method of ring-opening polymerization of cyclic olefins. The hydrogenation products of these ring-opening polymers may be produced by using a conventional method of hydrogenation.

The respective constituents of the present invention will be described in detail below.

Monomer

The component A used in the present invention is selected from the following two monomers. The first monomer is pentacyclopentadecadiene (4,9,5,8-dimethano-3a,4,4a,5,8, 8a,9,9a-octahydro-1H-benzoindene) represented by the following formula [IV] (the monomer being hereinafter abbreviated as PCDE).

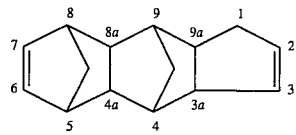

The PCDE may be obtained by subjecting cyclopentadiene to a Diels-Alder reaction with dicyclopentadiene, followed by separation from the reaction mixture by such techniques as distillation.

The other monomer of the component A is pentacyclopentadecene (4,9,5,8-dimethano-2,3,3a,4,4a,5, 8,8a,9,9a-decahydro-1H-benzoindene) represented by the following formula [V] (the monomer being hereinafter abbreviated as PCPD).

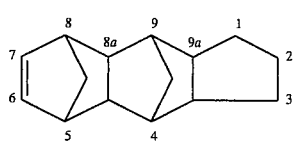

The above compound may be produced by subjecting cyclopentene to a Diels-Alder reaction with cyclopentadiene and subjecting the reaction product again to a Diels-Alder reaction with cyclopentadiene.

The above PCDE and PCPD may be used each alone or as a mixture thereof of any desired ratio.

The PCDE and PCPD may be respectively in the form of the derivatives thereof substituted with an alkyl such as methyl and ethyl.

The components B used in the present invention are dicyclopentadiene (hereinafter sometimes abbreviated as DCP), 2,3-dihydrodicyclopentadiene (4,7-methano-2,3,3a, 4,7,7a-hexahydroindene, hereinafter sometimes abbreviated as HDCP), the derivatives thereof substituted with an alkyl such as methyl, ethyl, propyl and butyl, or substituted or unsubstituted norbornene (hereinafter sometimes abbreviated as NB). They may be used each alone or as a suitable mixture thereof.

Substituted norbornenes include alkyl-substituted norbornenes such as 5-methyl-2-norbornene, 5,6-dimethyl-2-norbornene, 5-ethyl-2-norbornene and 5-butyl-2-norbornene, and alkylidene-substituted norbornenes such as ethylidenenorbornene.

In the present invention the component A is used in a proportion of 90–5% by mol, preferably 90–10% by mol, more preferably 80–20% by mol and the component B is used in a proportion of 10–95% by mol, preferably 10–90% by mol, more preferably 20–80% by mole. As the proportion of the component A used increases, the glass transition temperature of the resulting polymer increases. When the glass transition temperature becomes too high the polymer becomes difficult to work up. When the component A is not used, the glass transition temperature does not become sufficiently high, and particularly when the polymer is hydrogenated with the object of improving the resistance to thermal deterioration and the resistance to photo-deterioration the resulting polymer has a greatly lowered glass transition temperature as compared with the original polymer, which causes a problem in its practical use.

In the present invention, in addition to the above components A and B, other cycloolefins capable of ring-opening polymerization may be used within the range not substantially deleterious to the effect of the present invention. Specific examples of cycloolefins which may be used include compounds having one reactive double bond such as cyclopentene and 5,6-dihydrocyclopentadiene. They may usually be used or contained in the range of up to 30% by weight in the whole monomers.

Polycyclic norbornene-type monomers include also compounds which have two or more reactive double bonds. Such compounds are preferably removed as completely as possible because they are apt to cause gelation of polymer.

Although the monomer mixture used in the present invention may be prepared by mixing the component A and component B prepared beforehand, it can also be synthesized directly by the heat treatment of DCPs (namely, DCP and alkyl-substituted derivatives of DCP) or the heat treatment of DCPs in the presence of cyclopentene. Typical conditions for the heat treatment include heating DCPs alone, or DCPs and cyclopentene, in an atmosphere of inert gas such as nitrogen gas at a temperature of 120°–250° C., preferably 150°–230° C., for 0.5–20 hours, preferably 1–10 hours. The treatment may be either a batch-wise reaction or a continuous reaction. Also, an inert solvent may be present in the reaction system.

The heat treatment product is in the form of oil or wax. When DCPs alone are heat-treated, the products comprise as major components unreacted DCPs and PCDEs (trimer of cyclopentadienes) and contain a small amount of symmetrical cyclopentadiene trimer (namely, 1,4,5,8-dimethano-1,4,4a,4b,5,8,8a,9a-octahydro-9H-fluorene, hereinafter abbreviated as DOF) represented by the following formula [VI].

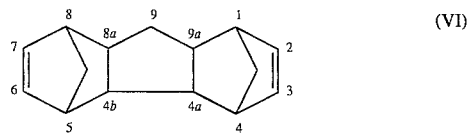

Such heat treatment products may be used as such, but when some insoluble components are present therein they are preferably removed by such means as filtration. Further, they may also be used after adjusting the proportion of DCPs and PCDEs appropriately by distillation.

The heat treatment products of DCPs and cyclopentenes give products which comprise as major components the above-mentioned PCPDs in addition to unreacted DCPs and above-mentioned trimers of cyclopentadienes and in some cases further contain unreacted cyclopentenes. Also in this case the products may be used as such like in the case of DCPs alone. Alternately, they may be used after appropriately removing cyclopentenes and DCPs.

However, the above-mentioned DOFs [VI] formed as by-products in the heat treatment have two highly reactive double bonds and may cause cross-linking and gelation during polymerization, so that they are preferably removed by purification till their content fall to 15% by weight or less, preferably 10% by weight or less, more preferably 5% by weight or less, in the whole monomers.

The heat treatment may be performed in the coexistence of such components as olefins such as propylene and butene, cycloolefins such as dihydrodicyclopentadienes, styrenes, and dienes such as butadiene and isoprene. In this case various norbornene-type compounds corresponding to component B can be obtained simultaneously in addition to PCDEs.

In the polymerization there may be added, besides the components A and B, aliphatic monoolefins and aliphatic non-conjugated diolefins, for example, butene-1, pentene-1, hexene-1, octene-1, butene-2, pentene-2, and 1,4-hexadiene in a range of up to about 10% by mol to control the molecular weight.

Polymerization Catalyst

The ring-opening polymers of these monomers can be produced by a conventional method of polymerization of norbornenes. As examples of the polymerization catalyst, mention may be made of compounds of platinum group metal such as ruthenium, rhodium, palladium, osmium, iridium and platinum (for example, Japanese Patent Application Kokoku (Post-Exam. Publn.) No. 46-14910) or systems comprising a compound of a transition metal such as titanium, vanadium, molybdenum and tungsten and an organometallic compound of the groups I–IV of the periodic table; the catalytic system may be incorporated with a third component such as a tertiary amine (for example, Japanese Patent Application Kokoku (Post-Exam. Publn.) Nos. 41-20111, 57-17883 and 57-61044; Japanese Patent Application Kokai (Laid-open) Nos. 54-86600 and 58-127728).

Although the polymerization catalysts are not particularly limited so long as they are metallic compounds capable of ring-opening polymerization of these monomers, preferable ones are catalytic systems comprising a transition metal compound such as titanium tetrahalide and an organometal such as an organoaluminum compound, or catalytic systems further comprising a third component such as an aliphatic or aromatic tertiary amine incorporated to the aforementioned systems.

Specific examples of the polymerization catalyst are described below.

Transition Metal Compound

Preferred metal compounds are those of such transition metals as titanium, vanadium, tungsten, molybdenum etc., more specifically the halide, oxyhalide, oxide, carbonyl compound and organic ammonium salt of these transition metals.

As specific examples, mention may be made of $TiCl_4$, $TiBr_4$, $VOCl_3$, $VOBr_3$, $WBr_2$, $WBr_4$, $WBr_6$, $WCl_2$, $WCl_4$, $WCl_5$, $WCl_6$, $WF_4$, $WI_2$, $WI_4$, $WOBr_4$, $WOCl_4$, $WOF_4$, $MoBr_2$, $MoBr_3$, $MoBr_4$, $MoCl_4$, $MoCl_5$, $MoF_4$, $MoOCl_4$, $MoOF_4$, $WO_2$, $H_2WO_4$, $NaWO_4$, $K_2WO_4$, $(NH_4)_2WO_4$, $CaWO_4$, $CuWO_4$, $MgWO_4$, $(CO)_5WC(OCH_3)(CH_3)$, $(CO)_5WC(OC_2H_5)(CH_3)$, $(CO)_5WC(OC_2H_5)(C_4H_5)$, $(CO)_5MoC(OC_2H_5)(CH_3)$, $(CO)_5Mo=C(OC_2H_5)(N(C_2H_5)_2)$, tridecylammonium molybdate, and tridecylammonium tungstate.

Organometallic Compound

Suitable organometallic compounds include those of metals of the groups I–IV of the periodic table, for example, organoaluminum compounds, organotin compounds, or compounds of lithium, sodium, magnesium, zinc, cadmium, boron etc.

Specific examples of the organoaluminum compounds include trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquibromide, isobutylaluminum sesquichloride, ethylaluminum dichloride, ethylaluminum dibromide, propylaluminum dichloride, isobutylaluminum dichloride, ethylaluminum dibromide, and ethylaluminum diiodide.

Specific examples of the organotin compound include tetramethyltin, diethyldimethyltin, tetraethyltin, dibutyldiethyltin, tetrabutyltin, tetraisocumyltin, tetraphenyltin, triethyltin fluoride, triethyltin chloride, triethyltin bromide, triethyltin iodide, diethyltin difluoride, diethyltin dichloride, diethyltin dibromide, diethyltin diiodide, ethyltin trifluoride, ethyltin trichloride, ethyltin tribromide and ethyltin triiodide. Further examples of the organometallic compound are n-butyllithium, n-pentylsodium, methylmagnesium iodide, ethylmagnesium bromide, methylmagnesium bromide, n-propylmagnesium chloride, t-butylmagnesium chloride, allylmagnesium chloride, diethylzinc, diethylcadmium, trimethylboron, triethylboron, and tri-n-butylboron.

Third Component

A third component can be added to the above catalytic system to increase the polymerization activity and improve the selectivity in ring-opening polymerization. Specific examples of the third component include molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, and further Lewis acids. Particularly preferred among them are aliphatic or aromatic tertiary amines, specific examples of which include triethylamine, dimethylamine, tri-n-butylamine, pyridine, and α-picoline.

Solvent

Although the polymerization of the ring-opening polymer used in the present invention can be performed without using a solvent, it can also be conducted in an inert organic solvent.

Specific examples include aromatic hydrocarbons such as benzene, toluene and xylene, aliphatic hydrocarbons such as n-pentane, hexane, and heptane, alicyclic hydrocarbons such as cyclohexane, and halogenated hydrocarbons such as methylene dichloride, dichloroethane, dichloroethylene, tetrachloroethane, chlorobenzene, dichlorobenzene and trichlorobenzene. They may also be used as a mixture of two or more thereof.

Polymerization Temperature

Though the temperature of the ring-opening polymerization is not critical, it is usually selected as desired from the range of −20° C. to 100° C.

Polymerization Pressure

Polymerization pressure is preferably selected usually from the range of 0 to 50 kg/cm$^2$.

Hydrogenation

The ring-opening polymer hydrogenation product of the present invention can be obtained by hydrogenating the above-mentioned ring-opening polymer to saturate a part or the whole of its olefinic unsaturated groups (i.e., the double bonds of the main chain and the double bonds of the unsaturated rings), whereby the polymer can be further improved in the resistance to thermal deterioration and resistance to photo-deterioration. The hydrogenation rate may theoretically ranges from 0 to 100% when the rate in the case wherein all the double bonds in the ring-opening polymer are saturated by hydrogenation is taken 100% and, also in practice, can be selected as desired from said range. However, to achieve the improvement of resistance to thermal deterioration and resistance to photo-deterioration, it is preferable to hydrogenate at least 50% of the main chain double bonds.

The hydrogenation of the ring-opening polymer may be performed by a conventional method. The hydrogenation catalysts to be used are not particularly limited so long as they are those commonly used in the hydrogenation of olefinic compounds, and are exemplified as follows. As examples of heterogeneous catalysts, mention may be made of nickel, palladium or platinum, or solid catalysts comprising these metals supported on a carrier such as carbon, silica, diatomaseous earth, alumina and titanium oxide, for example, nickel/silica, nickel/diatomaceous earth, palladium/carbon, palladium/silica, palladium/diatomaceous earth, palladium/alumina, etc. As examples of homogeneous catalysts, mention may be of those based on metals of the group VIII of the periodic table, for example those comprising a Ni or Co compound and an organometallic compound of metals of the groups I–III of the periodic table, such as nickel naphthenate/triethylaluminum, cobalt octenoate/n-butyllithium, and nickel acetonate/triethylaluminum, or Rh compounds.

The hydrogenation is conducted, depending on the kind of catalyst, in a homogeneous or heterogeneous system under a hydrogen pressure of 1–150 atm. at 0°–180° C., preferably 20°–100° C. The hydrogenation rate may be controlled as desired by varying the hydrogen pressure, reaction temperature, reaction time, catalyst concentration, etc. In order that the hydrogenation product may show excellent resistance to thermal deterioration and photo-deterioration, it is preferable to hydrogenate at least 50% of the main chain double bonds in the polymer. The hydrogenation rate is more preferably 80% or more, most preferably 90% or more.

Ring-Opening Polymer Hydrogenation Product

The ring-opening polymer used in the present invention has an intrinsic viscosity [η] of 0.01–20 dl/g, preferably 0.1–10 dl/g, as determined in toluene at 25° C. Similarly, the ring-opening polymer hydrogenation product of the present invention has an [η] of 0.01–20 dl/g, preferably 0.1–10 dl/g. Having the [η] in the above-mentioned range, the hydrogenation product has good thermal resistance, water resistance, transparency, chemical resistance, solvent resistance, processability and mechanical properties.

The hydrogenation product of a ring-opening polymer composed of the component A alone has a high glass transition temperature and is excellent in thermal resistance, but offers on the other hand a problem of poor processability. In contrast, when the component B is copolymerized the glass transition temperature of the polymer can be appropriately controlled and the thermal resistance can be made well-balanced with the processability. For instance, when DCP is used as the component B the glass transition temperature can be controlled in the range of 100°–200° C., preferably 120°–180° C., while when NB is used the temperature can be controlled in the range of 50°–180° C., preferably 80°–150° C.

The ring-opening polymer hydrogenation product of the present invention is still more improved in resistance to thermal deterioration and resistance to photo-deterioration as compared with the ring-opening polymer used therefor.

Processing

The ring-opening polymers and their hydrogenation products (those wherein at least 50% of the (C═══ C) linkages in the main chain are in the form of single bonds as the result of hydrogenation) of the present invention can be processed by techniques known to the art. In the processing various additives may be added including, for example, inorganic and organic fillers, stabilizers, antistatic agents and lubricants.

Usage

The ring-opening polymers of the present invention, particularly the hydrogenation products wherein at least 50% of the (C═══ C) linkages of the main chain are single bonds are, as is clear from the fact that they have a high glass transition temperature and the unsaturated groups have been hydrogenized, excellent in resistance to thermal deterioration and photo-deterioration and moreover have transparency, water resistance, chemical resistance and mechanical properties well-balanced with each other, so that they are valuable for use in wide fields as various formed articles.

For example, they may be used in the field of optics for optical lenses, optical discs, optical fibers, glass windows etc., in the field of electrics and electronics for water tanks of electric iron, microwave oven parts, substrates for liquid crystal display, printed boards, transparent electrically conductive sheets and films, etc., in the field of medical science for injectors, pipets, animal cages, etc., and in various other fields for camera bodys, housings of various instruments, films, sheets, helmets, etc.

EXAMPLE

The present invention will be described further in detail below with reference to Examples, but it is in no way limited thereto.

Referential Example 1

In a 500-ml separable flask which had been thoroughly dried and purged with nitrogen were placed 15 g of PCDE represented by the formula [IV] and 60 ml of toluene. Subsequently 1.5 mmols of triethylaluminum and 0.30 mmol of titanium tetrachloride were added and the resulting mixture was allowed to react with stirring at 25° C. for 4 hours. Thereafter, the intended product was precipitated with acetone/isopropanol (1/1), then collected by filtration, and again dissolved in toluene. Further, the product was precipitated with acetone/isopropanol (1/1) solvent, fitered and dried to give the intended product in 18% yield. The proton NMR analysis of the polymer obtained above showed that absorptions due to olefinic double bond protons and five-membered cycloolefin ring double bond protons were observed between δ=5.0 to 5.5 ppm, while absorptions (δ=5.6–6.0 ppm) due to norbornene ring double bond protons were not observed. Further, the ratio of the proton absorption intensity relating to double bonds to the absorption intensity due to the totality of protons agreed approximately with the theoretical value (22.2%). From these results it was confirmed that the polymer obtained above had undergone ring-opening polymerization. The ring-opening polymer had a glass transition temperature (determined by DSC) of 201° C. and an intrinsic viscosity of 0.30 dl/g as determined in toluene at 25° C. The polymer was soluble in benzene, toluene, cyclohexane, carbon tetrachloride and carbon disulfide at room temperature.

Three grams of the above polymer was dissolved in 30 ml of cyclohexane, and the solution was placed in a stainless steel ampoule of 100 cc volume together with 0.3 g of palladium-carbon and mixed. Then, air in the ampoule was replaced with hydrogen, and a hydrogen pressure of 50 kg/cm$^2$G was applied and kept for 30 minutes while the ampoule was being stirred at 10° C. Thereafter, the temperature was raised to 50° C. and stirring was conducted for 18 hours, whereupon a precipitate was obtained. The precipitate was dissolved in toluene, and the resulting solution was filtered through a 1 μm filter. The dissolved precipitate was reprecipitated in methanol, dried and purified.

The resulting product showed a glass transition point of 206° C. The NMR analysis of the product showed that the absorptions of δ=5.0–5.5 ppm due to double bonds had disappeared, confirming that the product had been hydrogenized nearly completely.

Example 1

In a 500-ml separable flask which had been thoroughly dried and purged with nitrogen were placed 80 g of a monomer mixture shown in Table 1 and further, in order, 220 g of toluene, 1.0% by mol of 1-hexene relative to the monomer, 12 mmols of triethylaluminum, 36 mmols of triethylamine, and 2.4 mmols of titanium tetrachloride, and the resulting mixture was allowed to react at 25° C. for 2 hours. Then the intended polymer was obtained from the reaction mixture by precipitation and washing with acetone/isopropanol (1/1) followed by drying.

The H$^1$-NMR analysis of the polymer showed that the absorptions (δ=5.6–6.0 ppm) due to norbornene ring double bonds had disappeared and all shifted to absorptions (δ=5.0–5.5 ppm) due to double bonds in 5-membered ring and olefin main chain, from which it was concluded that the polymer according to the present Example was a ring-opening polymer. The content of the repeating units in the obtained polymer was calculated based on the absorption peak area of double bond protons in the H$^1$-NMR spectrum.

Further, a 10% cyclohexane solution of the above polymer was mixed with 0.6 g of a 5% Pd-C catalyst and subjected to hydrogenation in a 1-l autoclave at 140° C. and a hydrogen pressure of 70 kg/cm$^2$.

The properties of the polymer and its hydrogenation product thus obtained are shown in Table 1. The light transmission was determined at 830 nm by use of a press-formed plate (disc) of 1.2 mm thickness. The solvent resistance was determined by immersing the above-mentioned disc in ethyl acetate and acetone at room temperature for 20 hours and then examining any change in appearance. The chemical resistance was determined by immersing the disc in 97.6% sulfuric acid or 28% aqueous ammonia solution at room temperature for 20 hours and then examining any change in appearance.

For comparison, the properties of a polymer obtained by using dicyclopentadiene alone as the monomer and the hydrogenation product thereof are also shown in Table 1.

TABLE 1

|  | Example of this invention | | | | | Comp. Example |
|---|---|---|---|---|---|---|
| Experiment No. | 1-1 | 1-2 | 1-3 | 1-4 | 1-5 | 1-6 |
| PCDE (Wt %) | 70 | 40 | 20 | 10 | 0 | 0 |
| PCPD (Wt %) | 0 | 0 | 0 | 0 | 40 | 0 |
| DCP (Wt %) | 30 | 60 | 80 | 90 | 60 | 100 |
| Yield (Wt %) | 59 | 62 | 67 | 63 | 67 | 68 |
| Glass transition temp. (Tg) (°C.) | 179 | 161 | 152 | 142 | 174 | 133 |
| Intrinsic viscosity [η] (dl/g) | 0.62 | 0.60 | 0.63 | 0.63 | 0.61 | 0.68 |
| PCDE or PCPD repeating unit content in polymer (mol %) | 53 | 34 | 12 | 6 | 35 | 0 |
| Hydrogenation rate (%) | 100 | 100 | 100 | 100 | 100 | 100 |
| Glass transition temp. (Tg) (°C.) | 178 | 135 | 123 | 111 | 137 | 93 |
| Intrinsic viscosity [η] (dl/g) | 0.64 | 0.62 | 0.63 | 0.64 | 0.62 | 0.68 |
| Light transmission (%) (1.2 mm thick disc, at 830 nm) | 91 | 91 | 92 | 91 | 92 | 91 |
| Moisture absorption (wt %) (JIS 6911) | 0.1> | 0.1> | 0.1> | 0.1> | 0.1> | 0.1> |
| Solvent resistance | | | | | | |
| Ethyl acetate | ○ | ○ | ○ | ○ | ○ | ○ |
| Acetone (20 hours, room temp.) | ○ | ○ | ○ | ○ | ○ | ○ |
| Chemical resistance | | | | | | |
| 28% Aq. ammonia | ○ | ○ | ○ | ○ | ○ | ○ |
| 97.6% Sulfuric acid (20 hours, room temp.) | ○ | ○ | ○ | ○ | ○ | ○ |

Note: The symbol ○ in the Table indicates that no change in appearance was recognized.

Referential Example 2

In an autoclave of 1 l volume equipped with a stirrer was placed 600 g of dicyclopentadiene and, after the inner atmosphere of the reactor was replaced with nitrogen, heated to 180° C. with stirring and subjected to heat treatment for 4 hours, followed by distillation under reduced pressure. After distillation at 2 Torr and 110° C.–120° C., 263 g of CPD trimer was obtained. Gas chromatographic analysis of the CPD trimer showed a composition of 84.5% by weight of PCDE, 14.7% by weight of DOF and 0.8% by weight of others.

In a 500-ml separable flask thoroughly dried and purged with nitrogen, were placed 40 g of the above trimer monomer, 260 ml of toluene, and further 12 mmols of triethylaluminum, 36 mmols of triethylamine and 2.4 mmols of titanium tetrachloride, and were allowed to react at room temperature for 2 hours. Thereafter, the intended product was precipitated with acetone/isopropanol (1/1), collected by filtration and redissolved in toluene. Then, the intended product was obtained from the solution by precipitation with acetone/isopropanol (1/1) solvent filtration and drying in a yield of 25 g. The ring-opening polymer thus obtained had a glass transition temperature (determined by DSC) of 203° C. and an intrinsic viscosity of 0.21 dl/g as determined in toluene at 25° C. The polymer was soluble in benzene, toluene, cyclohexane, carbon tetrachloride and carbon disulfide at room temperature.

Further, a solution of 20 g of the above polymer in 400 ml of cyclohexane was placed together with 2 g of a 5% Pd-C catalyst in an autoclave of 1 l volume. Then the inner atmosphere of the reactor was replaced with hydrogen, the above mixture was heated to 120° C., the hydrogen pressure was raised up to 70 atm., and the mixture was allowed to react for 8 hours while consumed hydrogen was being replenished. The catalyst was removed by filtration, and 17 g of hydrogenated polymer was obtained from the filtrate by reprecipitation in isopropanol/acetone solution and drying.

The hydrogenated product had a glass transition temperature of 206° C.

The $H^1$-NMR analysis of the product showed the disappearance of the absorptions (δ=5.0–6.0 ppm) due to double bonds, confirming that the polymer had been hydrogenized nearly completely.

Example 2

In a 500-ml separable flask thoroughly dried and purged with nitrogen were placed 80 g of a monomer mixture shown in Table 2 and further, in order, 200 g of toluene, 1.0% by mol of 1-hexene relative to the monomer, 12 mmols of triethylaluminum, 36 mmols of triethylamine, and 2.4 mmols of titanium tetrachloride, and the resulting mixture was allowed to react at 25° C. for 2 hours. Then the intended polymer was obtained from the reaction mixture by precipitation and washing with acetone/isopropanol (1/1) followed by drying.

The $H^1$-NMR analysis of the polymer showed that the absorptions (δ=5.6–6.0 ppm) due to norbornene ring double bonds had disappeared and all shifted to absorptions (δ=5.0–5.5 ppm) due to double bonds in the 5-membered ring and olefin main chain, from which it was concluded that the polymer according to the present Example was a ring-opening polymer. The content of the repeating units in the obtained polymer was calculated from the analysis based on the absorption peak area of double bond protons in the $H^1$-NMR spectrum and the amount of residual monomer in the polymerization solution quantitatively determined by gas chromatography.

Further, a 10% cyclohexane solution of the above polymer was mixed with 0.6 g of a 5% Pd-C catalyst and subjected to hydrogenation in a 1-l autoclave at 140° C. and a hydrogen pressure of 70 kg/cm².

The properties of the polymer and its hydrogenation product thus obtained are shown in Table 2. The light transmission, solvent resistance and chemical resistance were determined in the same manner as in Example 1.

TABLE 2

|  | Example of this invention | | |
|---|---|---|---|
| Experiment No. | 2-1 | 2-2 | 2-3 |
| PCDE (Wt %) | 80 | 60 | 40 |
| DCP (Wt %) | — | — | 30 |
| NB (Wt %) | 20 | 40 | 30 |
| Yield (Wt %) | 59 | 60 | 65 |
| Tg (°C.) | — | — | — |
| Intrinsic viscosity [η] (dl/g) | 0.60 | 0.61 | 0.59 |
| PCDE repeating unit content in polymer (mol %) | 64 | 42 | 28 |
| DCP repeating unit content in polymer (mol %) | — | — | 30 |
| NB repeating unit content in polymer (mol %) | 36 | 58 | 42 |
| Hydrogenation rate (%) | 100 | 100 | 100 |
| Tg (°C.) | 149 | 100 | 105 |
| Intrinsic viscosity [η] (dl/g) | 0.59 | 0.59 | 0.60 |
| Light transmission (%) (1.2 mm thick disc, at 830 nm) | 91 | 92 | 92 |
| Moisture absorption (Wt %) (JIS 6911) | 0.1> | 0.1> | 0.1> |
| Solvent resistance | | | |
| Ethyl acetate | ○ | ○ | ○ |
| Acetone (20 hours, room temp.) | ○ | ○ | ○ |
| Chemical resistance | | | |
| 28% Aq. ammonia | ○ | ○ | ○ |
| 97.6% Sulfuric acid (20 hours, room temp.) | ○ | ○ | ○ |

Note: The symbol ○ in the Table indicates that no change in appearance was recognized.

Example 3

In a 500-ml separable flask thoroughly dried and purged with nitrogen were placed 80 g of a monomer mixture shown in Table 3 and further, in order, 220 g of toluene, 1.0% by mol of 1-hexene relative to the monomer, 12 mmols of triethylaluminum, 36 mmols of triethylamine, and 2.4 mmols of titanium tetrachloride, and the resulting mixture was allowed to react at 25° C. for 2 hours. Then, the intended polymer was obtained from the reaction mixture by precipitation and washing with acetone/isopropanol (1/1) followed by drying.

The $H^1$-NMR analysis of the polymer showed that the absorption ($\delta$=5.6–6.0 ppm) due to norbornene ring double bonds had disappeared and all shifted to absorptions ($\delta$=5.0–5.5 ppm) due to double bonds in the 5-membered ring and olefin main chain, from which it was concluded that the polymer according to the present Example was a ring-opening polymer.

The properties of the polymer obtained above are shown in Table 3. The content of the repeating units in the polymer was calculated based on the absorption peak area of double bond protons in the $H^1$-NMR spectrum. The light transmission was determined at 830 nm with a thin film of 15 μm thickness formed by casting. The solvent resistance was determined by immersing the above-mentioned thin film in ethyl acetate or acetone at room temperature for 20 hours and then examining any change in appearance. The chemical resistance was determined by immersing the thin film in 28% aqueous ammonia solution at room temperature for 20 hours and then examining any change in appearance.

For comparison, the properties of a polymer obtained by using dicyclopentadiene alone as the monomer are also shown in Table 3.

TABLE 3

|  | Example of this invention | | | | | Comp. Example |
|---|---|---|---|---|---|---|
| Experiment No. | 3-1 | 3-2 | 3-3 | 3-5 | 3-6 | 3-7 |
| PCDE (Wt %) | 70 | 40 | 20 | 10 | 0 | 0 |
| PCPE (Wt %) | 0 | 0 | 0 | 0 | 40 | 0 |
| DCP (Wt %) | 30 | 60 | 80 | 90 | 60 | 100 |
| Yield (Wt %) | 59 | 62 | 67 | 63 | 67 | 68 |
| Glass transition temp. (Tg) (°C.) | 179 | 161 | 152 | 142 | 174 | 133 |
| Intrinsic viscosity [η] (dl/g) | 0.62 | 0.60 | 0.63 | 0.63 | 0.61 | 0.68 |
| PCDE or PCPD repeating unit content in polymer (mol %) | 53 | 34 | 12 | 6 | 35 | 0 |
| Light transmission (%) (15 μm thick film, at 830 nm) | 93 | 92 | 93 | 93 | 93 | 92 |
| Moisture absorption (Wt %) (JIS6911) | 0.1> | 0.1> | 0.1> | 0.1> | 0.1> | 0.1> |
| Solvent resistance | | | | | | |
| Ethyl acetate | ○ | ○ | ○ | ○ | ○ | ○ |
| Acetone (20 hours, room temp.) | ○ | ○ | ○ | ○ | ○ | ○ |
| Chemical resistance | | | | | | |
| 28% Aq. ammonia (20 hours, room temp.) | ○ | ○ | ○ | ○ | ○ | ○ |
| Dielectric constant ($10^6$%) (JIS K-6911) | 2.1 | 2.2 | 2.3 | 2.3 | 2.2 | 2.4 |

Note: The symbol ○ in the Table indicates that no change in appearance was recognized.

Industrial Applicability

The novel ring-opening polymer and its hydrogenation product of the present invention are excellent in resistance to thermal deterioration and photo-deterioration and have well-balanced properties including transparency, water resistance, chemical resistance, solvent reistance, dielectric characteristic and mechanical properties such as rigidity, so that they can be used in a variety of field including the field of optics.

We claim:

1. A polycyclic norbornene-based ring-opening polymer which comprises:

(A) 90–5% by mol of a repeating unit represented by the following formula (I) or an alkyl-substituted derivative thereof, and (B) 10–95% by mol of at least one repeating unit selected from the group consisting of a repeating unit represented by the following formula (II), an alkyl-substituted derivative thereof, and a repeating unit represented by the following formula (III), an alkyl-substituted derivative thereof or an alkylidene-substituted derivative thereof, and wherein said polymer has an intrinsic viscosity of 0.01–20 dl/g as determined in toluene at 25° C.

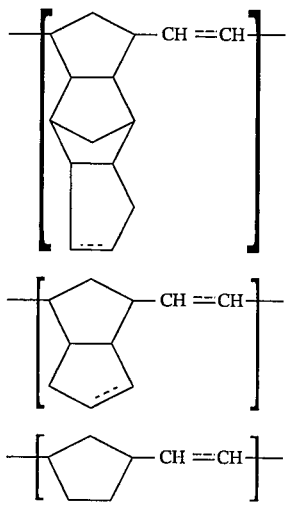

wherein ——— denotes a single bond or a double bond and wherein at least 50% of the (C——— C) linkages constituting the main chains of the respective repeating units are single bonds.

2. A polycyclic norbornene-based ring-opening polymer according to claim 1 wherein at least 80% of the (C——— C) linkages constituting said main chains are single bonds.

3. A polycyclic norbornene-based ring-opening polymer according to claim 1 wherein the repeating unit of (B) is the one represented by the formula [II] or an alkyl-substituted derivative thereof.

4. A polycyclic norbornene-based ring-opening polymer according to claim 3 wherein the glass transition temperature of the polymer is 100°–200° C.

5. A polycyclic norbornene-based ring-opening polymer according to claim 1 wherein the repeating unit of (B) is the one represented by the formula [III], an alkyl-substituted derivative thereof, or an alkylidene-substituted derivative thereof.

6. A polycyclic norbornene-based ring-opening polymer according to claim 5 wherein the glass transition temperature of the polymer is 50°–180° C.

7. A polycyclic norbornene-based ring-opening polymer according to claim 1 wherein the polymer is composed of the repeating unit represented by the formula [I] or an alkyl-substituted derivative thereof, the repeating unit represented by the formula [II] or an alkyl-substituted derivative thereof, and the repeating unit represented by the formula [III], an alkyl-substituted derivative thereof or an alkylidene-substituted derivative thereof.

8. A polycyclic norbornene-based ring-opening polymer according to claim 1 which comprises 90–5% by mol of the repeating unit represented by the formula [I] and 10–95% by mol of the repeating unit represented by the formula [II] or an alkyl-substituted derivative thereof, and has an intrinsic viscosity [η] of 0.01–20 dl/g as determined in toluene at 25° C.

9. A process for producing a polycyclic norbornene-based ring-opening polymer hydrogenation product which is characterized by hydrogenating a part or the whole of the olefinic unsaturated groups contained in the polycyclic norbornene-based ring-opening polymer according to claim 1, with hydrogen by use of a hydrogenation catalyst, thereby converting at least 50% of the (C——— C) linkages to single bonds.

10. A process for producing the polycyclic norbornene-based ring-opening polymer hydrogenation product according to claim 9, comprising polymerizing a monomer mixture comprising 90–5% by mol of 4,9,5,8-dimethano-3a,4,4a,5,8,8a,9,9a-octahydro-1H-benzoindenes and 10–95% by mol of dicyclopentadienes, dihydrodicyclopentadienes and/or norbornenes, in the presence of a catalytic system containing a titanium tetrahalide and an organometal compound of a metal of groups I–IV of the periodic table, and hydrogenating at least 50% of the (C——— C) linkages of the main chains of the resulting polymer in the presence of a hydrogenating catalyst.

11. A process for producing the polycyclic norbornene-based ring-opening polymer hydrogenation product according to claim 9, comprising polymerizing a monomer mixture comprising 90–5% by mol of 4,9,5,8-dimethano-3a,4,4a,5,8,8a,9,9a-octahydro-1H-benzoindenes and/or 4,9,5,8-dimethano-2,3,3a,4,4a,5,8,8a,9,9a-decahydro-1H-benzoindenes and 10–95% by mol of dicyclopentadienes, dihydrodicyclopentadienes and/or norbornenes, in the presence of catalytic system containing a titanium tetrachloride, an organometal compound of a metal of groups I–IV of the periodic table and an aliphatic or aromatic tertiary amine, and hydrogenating at least 50% of the (C——— C) linkages of the main chains of the resulting polymer in the presence of a hydrogenating catalyst.

* * * * *